April 26, 1960  L. J. BISHOP ET AL  2,934,195
WORK HANDLING AND TRANSFER SYSTEMS
Filed July 30, 1954  8 Sheets-Sheet 2

INVENTOR.
LEONARD J. BISHOP
ROBERT KRAMMER
BY KARL R. KARLSTROM
Whittemore Hulbert & Belknap
ATTORNEYS

INVENTOR.
LEONARD J. BISHOP
ROBERT KRAMMER
BY KARL R. KARLSTROM

Whittemore Hulbert + Belknap

ATTORNEYS

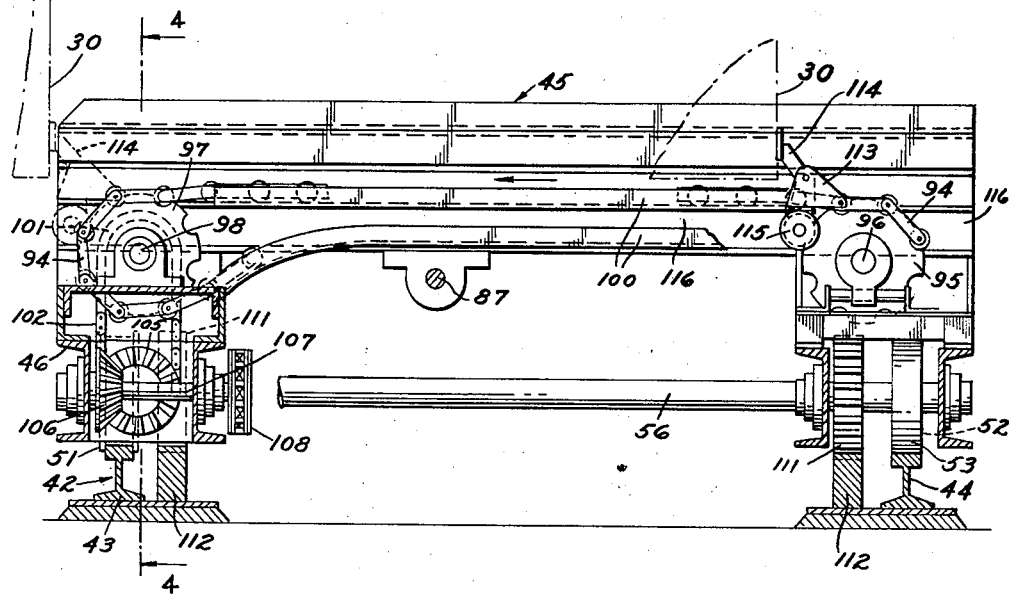
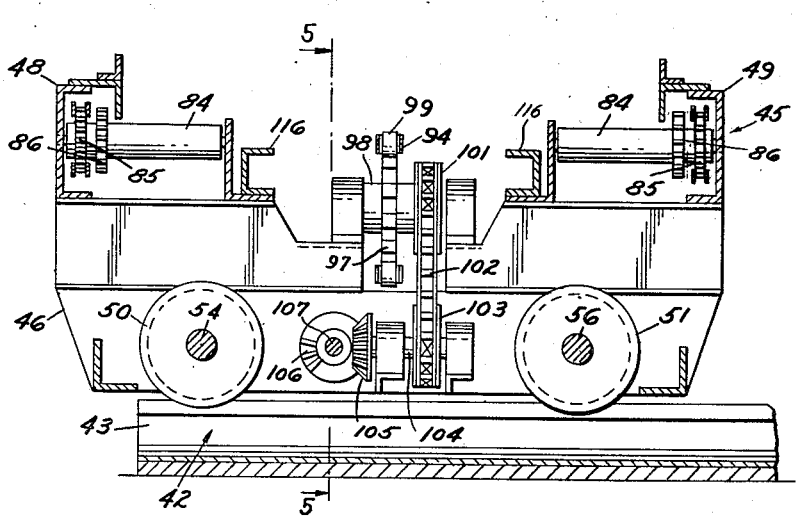

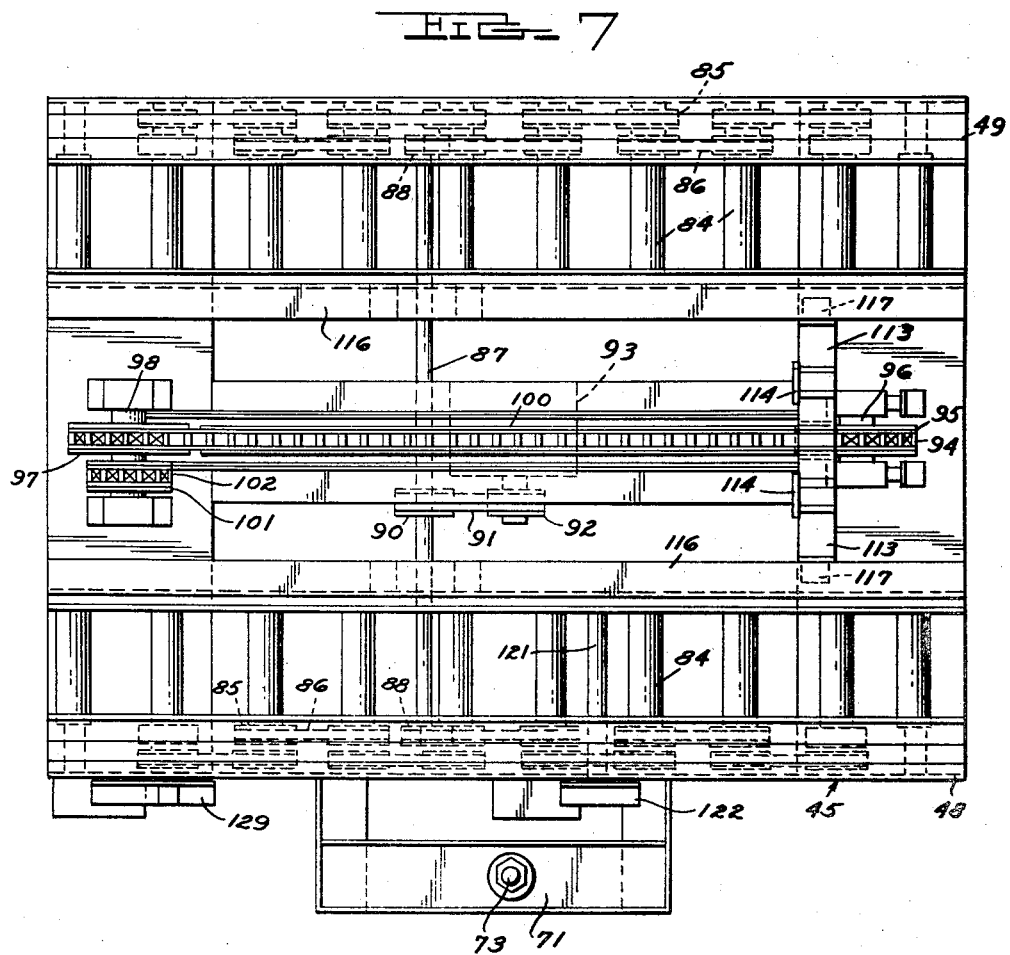

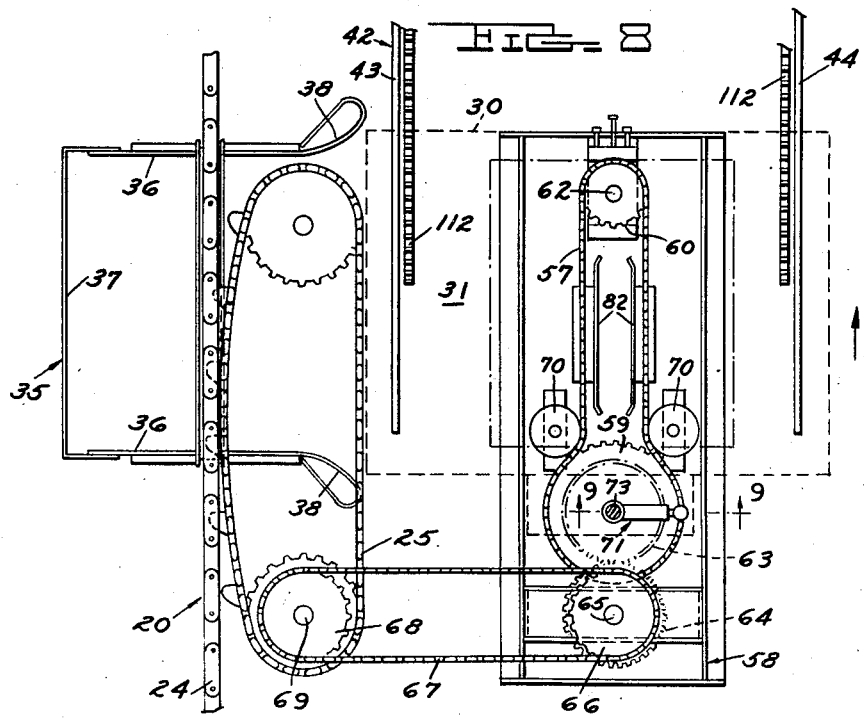
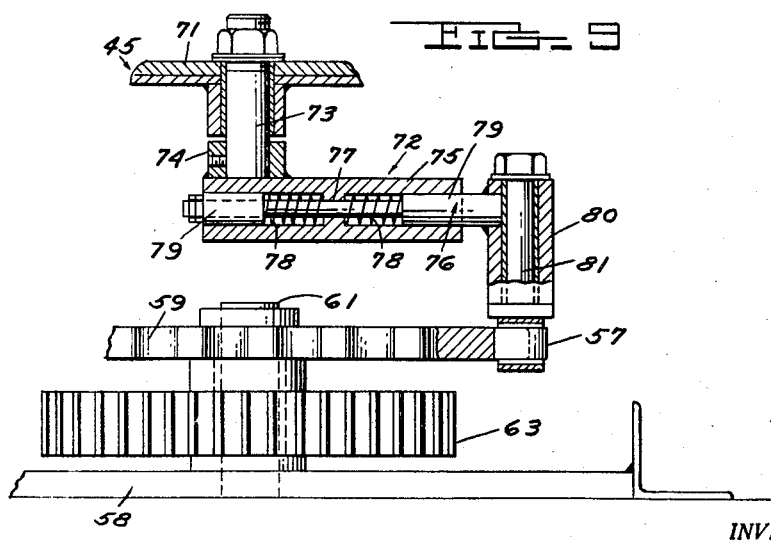

April 26, 1960 L. J. BISHOP ET AL 2,934,195
WORK HANDLING AND TRANSFER SYSTEMS
Filed July 30, 1954 8 Sheets-Sheet 7
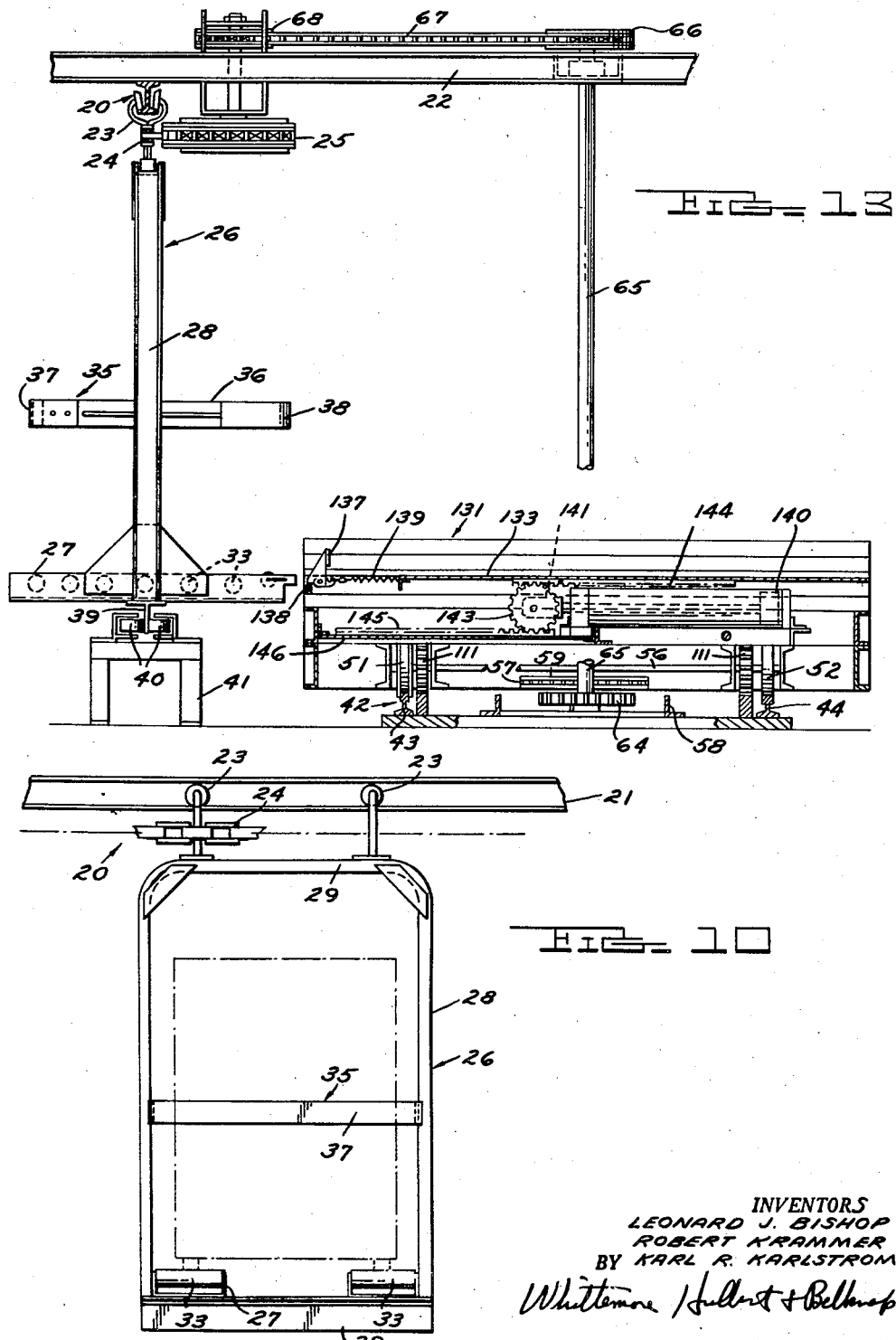
INVENTORS
LEONARD J. BISHOP
ROBERT KRAMMER
BY KARL R. KARLSTROM
Whittemore Hulbert & Belknap
ATTORNEYS April 26, 1960  L. J. BISHOP ET AL  2,934,195
WORK HANDLING AND TRANSFER SYSTEMS
Filed July 30, 1954  8 Sheets-Sheet 8
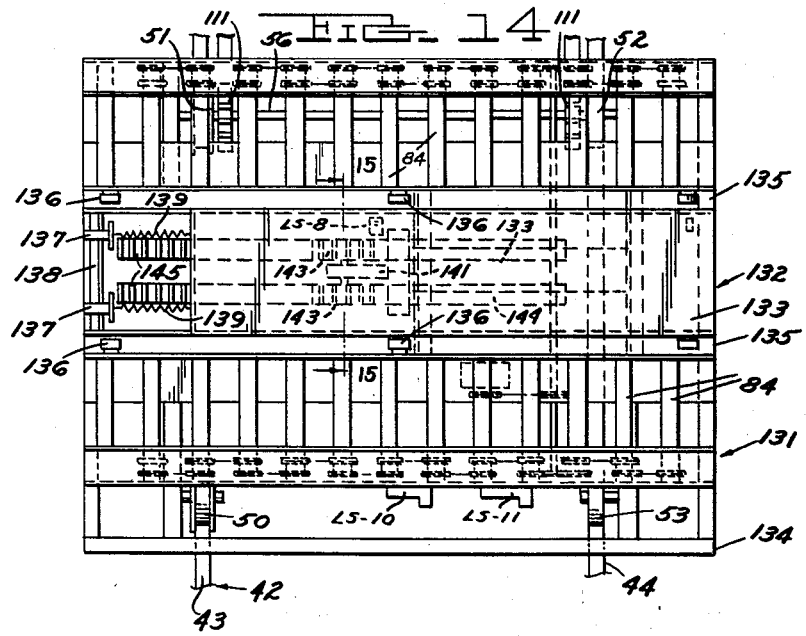
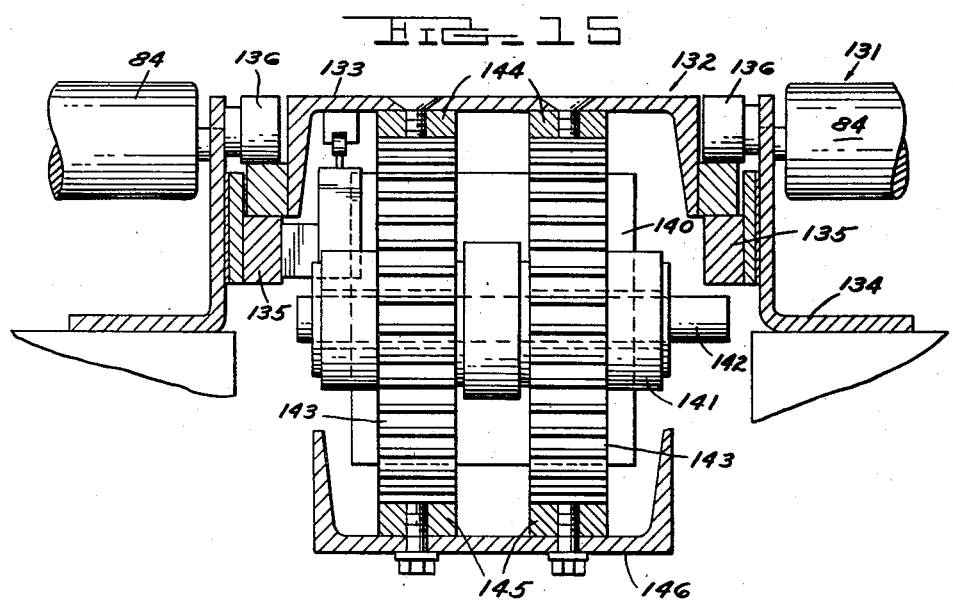
INVENTORS
LEONARD J. BISHOP
ROBERT KRAMMER
BY KARL R. KARLSTROM
Whittemore, Hulbert & Belknap
ATTORNEYS

United States Patent Office 2,934,195
Patented Apr. 26, 1960

2,934,195

WORK HANDLING AND TRANSFER SYSTEMS

Leonard J. Bishop, Birmingham, Robert Krammer, Detroit, and Karl R. Karlstrom, St. Clair Shores, Mich., assignors to Mechanical Handling Systems Inc., Detroit, Mich., a corporation of Michigan Application July 30, 1954, Serial No. 446,828

16 Claims. (Cl. 198—24)

This invention relates generally to a work handling system having a conveyor equipped with work carriers and refers more particularly to improved means for loading and/or unloading the carriers on the conveyor.

It is an object of the present invention to provide means for loading and/or unloading the carriers on the conveyor while the latter is being advanced along its predetermined path of travel. Hence, stopping of the conveyor at preselected loading and/or unloading stations is rendered unnecessary and the time required to handle the work is correspondingly reduced.

It is another object of this invention to provide a work handling system of the above type having a carriage movable in opposite directions along the path of the conveyor and having means for moving the carriage in the direction of advancement of the conveyor at the same rate as the conveyor enabling transferring a load from either the carriage to an adjacent carrier on the conveyor or to transfer a load from the carrier to the carriage without stopping the conveyor or reducing the speed of advancement of the conveyor.

It is still another object of this invention to provide a carriage having driving means operatively connected to the conveyor driving means for moving the carriage in opposite directions along the path of travel of the conveyor and also having transfer means which operate in timed relationship to movement of the carriage in the direction of advancement of the conveyor to either move a load from the carriage to a position on an adjacent carrier or to move a load from the carrier to a position on the carriage, depending on whether the latter is used for loading or unloading.

It is a further object of this invention to provide a work handling system of the foregoing type having means for assuring operation of the transfer carriage in proper timed relationship to the conveyor and also having safety means for stopping the conveyor should the operation of the transfer carriage get out of phase with the conveyor.

The foregoing as well as other objects will be made more apparent as this description proceeds especially when considered in connection with the accompanying drawings, wherein:

Figure 4 is a sectional view taken substantially on the line 4—4 of Figure 5;

Figure 5 is a sectional view taken substantially on the line 5—5 of Figure 4;

Figure 7 is a plan view of the loading transfer carriage;

Figure 8 is a semi-diagrammatic plan view of the structure shown in Figure 2 having the loading carriage removed for the sake of clearness;

Figure 9 is a sectional view taken substantially on the line 9—9 of Figure 8;

Figure 10 is an elevational view of the rear end of one of the carriers on the conveyor;

Figure 11 is a fragmentary semi-diagrammatic side elevational view of a part of the platform for one of the conveyor carriers;

Figure 12 is a fragmentary side elevational view of the means for transferring a load onto the loading carriage;

Figure 13 is a semi-diagrammatic side elevational view of the unloading carriage and conveyor means;

Figure 14 is a plan view of the unloading transfer carriage;

Figure 15 is a sectional view taken on the line 15—15 of Figure 14; and

Figure 16 is a diagrammatic plan view of the unloading station including the unloading transfer carriage.

Figure 2:
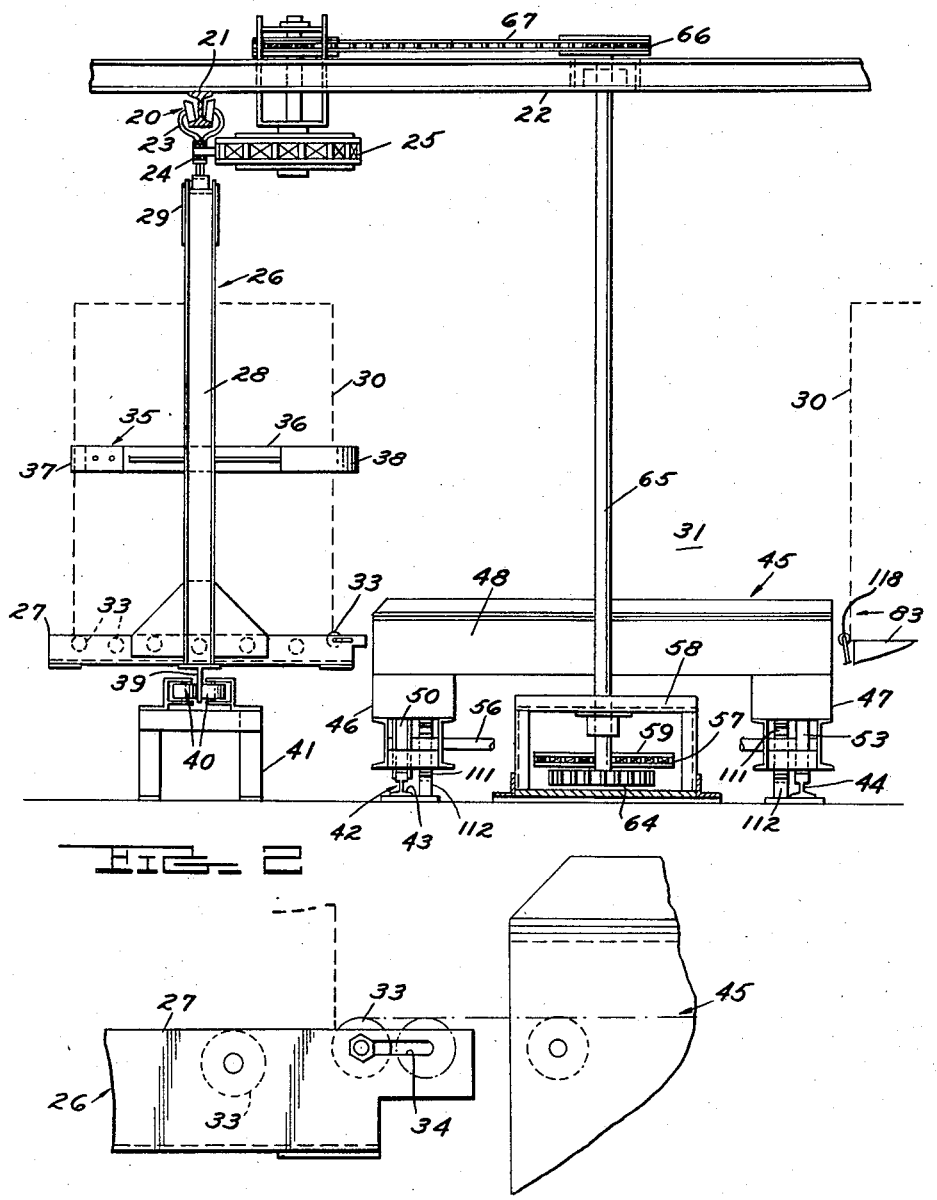
Figure 2 is a semi-diagrammatic end elevational view partly in section of the loading carriage and associated conveyor.

As shown in Figures 2, 8 and 10 of the drawings, the numeral 20 designates a conveyor of the monorail type having an I-shaped rail 21 supported on suitable frame structure 22 and having trolleys 23 mounted on the rail in spaced relationship lengthwise of said rail. In accordance with conventional practice, the trolleys 23 are advanced along the rail by a link-type chain 24 and this chain is driven by a caterpillar-type chain 25 also supported on the frame structure 22.

Suspended from adjacent pairs of trolleys 23 (Fig. 10) is a carrier 26 having a platform 27 and having frame bars 28 extending upwardly from opposite sides of the platform 27 intermediate the front and rear ends of the latter. The upper ends of the frame bars 28 are connected by a cross bar 29 and the latter is attachable to adjacent trolleys 23 in any suitable manner. The front end of the carrier 26 is open or unobstructed to enable a load such, for example, as a crate 30 to be either transferred onto the platform 27 or removed from the latter, depending on whether the carrier is passing through the loading zone 31 or the unloading zone 32, shown in Figure 16 of the drawings.

In order to facilitate loading or unloading a crate with respect to the carrier 26, the platform 27 is equipped with rollers 33 positioned to engage the bottom of a crate 30. As shown in Figure 10 of the drawings, the rollers 33 are respectively arranged in rows at opposite sides of the platform 27 and the rollers 33 at the front end of the platform 27 are elevated to some extent (Figure 11) with respect to the remaining rollers in order to engage the front end of a crate and thereby resist accidental shifting movement of the crate in a forward direction relative to the platform 27. It will also be noted from Figure 11 of the drawings that the rollers 33 at the front end of the platform 27 are mounted in slots 34 formed in opposite side walls of the platform 27 and extending in the direction of length of the platform to enable adjusting the forwardmost rollers 33 between the two positions shown in Figure 11. Thus, crates of different length may be readily accommodated on the platform 27.

The crates 30 are guided into proper relationship with respect to the carrier 26 by a U-shaped member 35 having the legs 36 respectively secured to the upright bars 28 intermediate the ends of the latter and having the base 37 extending along the rear end of the carrier to engage the rear wall of the crate 30 and thereby prevent displacement of the crate 30 in a rearward direction relative to the platform 27. As shown in Figure 8 of the drawings, the front ends of the legs 36 are flared outwardly as at 38 and cooperate with one another to guide a crate 30 into position on the carrier 26.

Referring again to Figure 2 of the drawings, it will be noted that a guide in the form of a T-bar 39 is secured to the underside of the platform 27 intermediate opposite ends of the latter. The guide 39 extends in the direction of advancement of the conveyor 20 and is engaged at opposite sides with rollers 40. The rollers 40 are supported on suitable frame structure 41 in positions adjacent the loading and unloading stations 31 and 32 respectively. The purpose of this construction is to prevent swinging movements of the carriers 26 laterally relative to the conveyor 20 during loading and unloading of the carriers.

Extending parallel to the path of travel of the conveyor 20 throughout the length of the loading zone or station 31 is a track 42 comprising laterally spaced rails 43 and 44. Movable back and forth along the track 42 is a loading carriage 45 including a load supporting bed having laterally spaced end frame sections 46 and 47, and having side frame section 48 and 49, respectively connecting opposite ends of the end frame sections. A pair of flanged wheels 50 and 51 (Figure 4) are respectively rotatably supported at opposite ends of the frame section 46 in positions to engage the rail 43, and a pair of plain wheels 52 and 53 are respectively rotatably supported on opposite ends of the frame section 47 in positions to engage the track rail 44. The wheels 50 and 52 are respectively mounted on axially aligned shafts 54 and 55 (Figure 3) journalled on the end frame sections, and the wheels 51 and 53 are rspectively mounted on opposite ends of a shaft 56 also journaled on the end frame sections of the carriage 45. The arrangement is such that the carriage 45 is guided by the track 42 along a path parallel to the path of the conveyor 20.

In the present instance, the carriage 45 is moved back and forth along the track 42 at the same rate of travel as the conveyor 20. As shown in Figures 2 and 8 of the drawings, an endless chain 57 is supported on frame structure 58 beneath the carriage 45 and extends in the direction of length of the track 42. One end of the chain 57 extends around a sprocket 59 of relatively large diameter and the opposite end of the chain 57 extends around a sprocket 60 of relatively small diameter. The sprocket 59 is secured to the upper end of a vertical stub shaft 61 (Figures 3 and 9) and the sprocket 60 is secured to the upper end of a vertical shaft 62. The shaft 61 has a gear 63 secured thereto directly below the sprocket 59 and this gear meshes with a gear 64 (Figures 2 and 8) secured to the lower end of a vertical drive shaft 65. The upper end of the drive shaft 65 is journalled on the frame structure 22 and has a sprocket 66 secured thereto. The sprocket 66 (Figure 8) is connected by a chain 67 to a sprocket 68 which is secured to the sprocket shaft 69 of the caterpillar chain 25. The sprocket shaft 69 is driven by a suitable electric motor through the medium of a speed reducer, not shown herein.

The above driving means is such that the chain 57 is driven at the same linear speed as the conveyor 20. Referring again to Figure 8, it will be noted that opposite sides of the chain 57 are engaged by rolls 70 in such a manner that opposite sides of the chain 57 extend in straight parallel lines between the sprockets 59 and 60. The chain 57 is operatively connected to a draw bar 71 on the carriage 45 by a coupling 72, shown in Figure 9 of the drawings. The coupling 72 comprises a vertical pivot 73 journaled on the draw bar 71 in axial alignment with the shaft 61, and a crank 74 secured to the lower end of the pivot 73. One arm 75 of the crank 74 is bored lengthwise thereof to slidably support a plunger 76 having an intermediate section of reduced diameter extending axially through a transverse wall 77 in the bore and forming abutments for the adjacent inner ends of coil springs 78. The outer ends of the springs respectively engage the enlargements 79 formed on the plunger 76 by the reduced intermediate section of the plunger. The plunger 76 and associated springs 78 serve as a shock absorber for the operative connection between the draw bar 71 and chain 57.

The outer end of the plunger 76 is secured to a bushing 80 having a bearing arranged with its axis parallel to the axis of the pivot pin 73 and forming a journal for a pivot pin 81 having the lower end pivoted to one link of the chain 57. It follows from the above that the carriage 45 is pulled back and forth by the chain 57 through the medium of the shock absorbing connection 72. It will be noted from Figure 8, that the carriage 45 actually travels back and forth throughout a distance equal to the distance between the axes of the respective shafts 61 and 62. In other words, the outer circumferential portions of the respective sprockets 59 and 60 merely provide idling or dwell periods wherein the carriage 45 is stationary. The dwell period afforded by the relatively large diameter sprocket 59 is sufficient to afford the time required to load a crate 30 on the carriage 45 while the latter is held in a fixed position. This dwell period is also predetermined to afford the time required for an approaching carrier 26 to register with the carriage 45 before the latter is advanced by the chain 57. The bars 82 are arranged on the frame structure 58 to serve as back-up members for the opposite sides of the chain 57 during movement of the carriage 45.

It will also be noted from Figure 8 of the drawings that the carriage 45 is positioned at the receiving end of the loading zone 31 during the time the operative connection 72 is moved throughout the dwell. As stated above, the dwell period affords ample time to load a crate 30 on the carriage 45 and for accomplishing this result a roller flight supply conveyor 83 is arranged at the front end of the transfer carriage 45 opposite the receiving end of the loading zone 31. The crates 30 are supported in end to end relationship on the top of the supply conveyor 83 and are successively moved by the latter on to the carriage 45 when the carriage is located in the position thereof shown in Figure 1 of the drawings.

Figure 3:
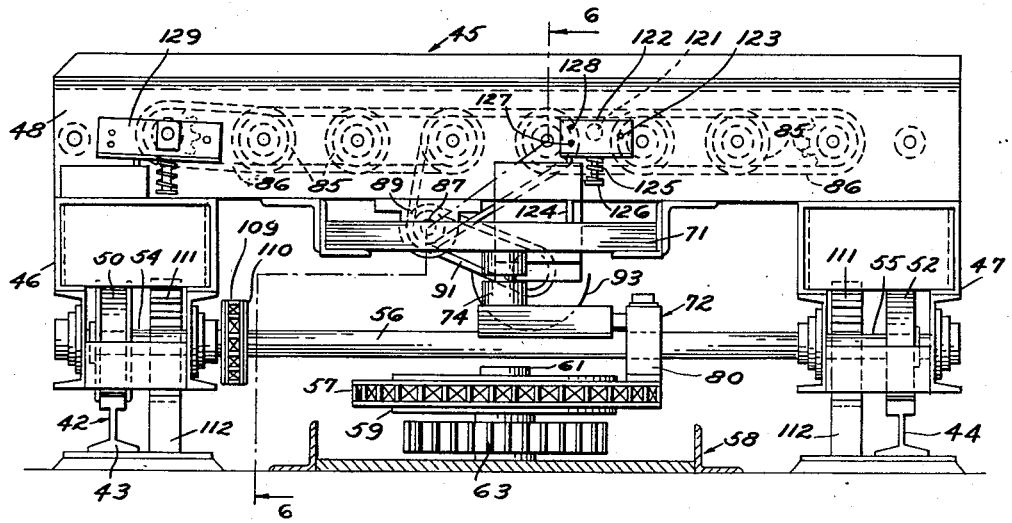
Figure 3 is an end elevational view of the loading transfer carriage.

A crate 30 advanced by the supply conveyor 83 on to the carriage 45 is moved along the carriage toward the conveyor 20 by two sets of power driven rollers 84 respectively rotatably supported at opposite sides of the carriage 45 with their axes extending parallel to the direction of movement of the carriage 45 by the chain 57. The rollers 84 in each set are respectively connected by sprockets 85 and chains 86 in the manner shown in Figure 7 of the drawing so that all of the rollers 84 are driven from a common shaft 87. The drive shaft 87 has a pair of sprockets 88 respectively secured to opposite ends thereof and respectively connected by chains 89 to sprockets secured to adjacent rollers 84 of each set, as shown in Figure 3 of the drawings. In addition, the drive shaft 87 has a sprocket 90 connected by a chain 91 to a sprocket 92 which, in turn, is secured to the drive shaft of an electric motor 93 suitably supported on the carriage. As will be more fully hereinafter described, the motor 93 is started to drive the rollers 84 in timed relationship to advancement of a crate 30 from the supply conveyor 83 to the carriage 45. The rollers 84 are, of course, driven in a direction to advance the crate toward the rear end of the carriage or, in other words, toward the conveyor 20. It will also be noted from the following description that the operation of the motor 93 is discontinued in response to proper positioning of a crate 30 on the transfer carriage 45.

After a crate 30 is deposited on the transfer carriage 45, provision is made herein for transferring the crate on the platform 27 of an adjacent carrier 26 on the conveyor 20 during the interval the carriage 45 is moved by the chain 57 in the direction of the conveyor 20. The means for accomplishing this result is shown in Figures 3, 4, 5 and 7 of the drawings, and comprises an endless chain 94 elongated in the direction of length of the carriage 45. The front end of the chain 94 extends around a sprocket 95 secured to a shaft 96 having its axis extending horizontally and journaled in bearings supported by the frame structure of the carriage. The opposite end of the chain 94 extends around a sprocket 97 which is secured to a shaft 98 having its axis extending parallel to the shaft 96 and having the opposite ends also journaled in bearings supported on the frame structure of the carriage 45. The portions of the chain 94 extending between the sprockets are guided by rollers 99 mounted on the chain in spaced relationship lengthwise of the latter and respectively engaging tracks 100.

Figure 6:
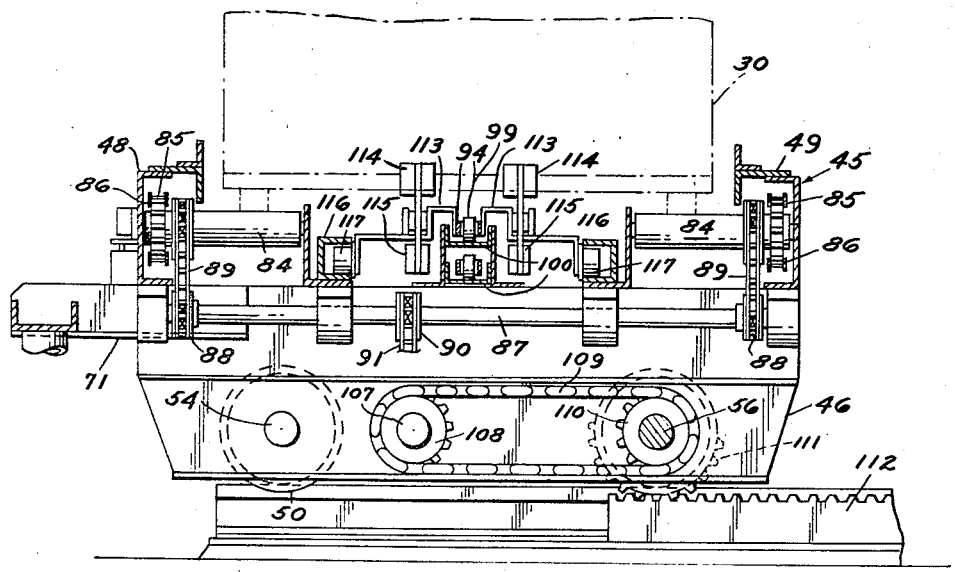
Figure 6 is a sectional view taken substantially on the line 6—6 of Figure 3.

As shown in Figure 4 of the drawings, a sprocket 101 is secured to the shaft 98 and is connected by a chain 102 to a sprocket 103 which is secured to a shaft 104 having its axis extending parallel to the shaft 98. The shaft 104 is journaled in bearings suitably supported on the frame structure of the carriage 45 and a beveled gear 105 is secured to one end of the shaft 104. The beveled gear 105 meshes with a corresponding beveled gear 106 secured to a shaft 107 which is also journaled in bearings suitably supported on the frame structure of the carriage 45. As shown in Figure 6 of the drawings, a sprocket 108 is secured to the shaft 107 and is connected by a chain 109 to a sprocket 110 which is secured to the shaft 56.

A pair of gears 111 are respectively secured to the shaft 56 adjacent the track engaging wheels 51 and 53. The gears 111 respectively mesh with racks 112 which extend lengthwise of the track 42 at the inner sides of the rails 43 and 44. The arrangement is such that movement of the carriage 45 in the direction of the arrow shown in Figures 1 and 8 of the drawings, rotates the chain 94 to move the top length of the latter in a rearward direction indicated by the arrow in Figure 5 of the drawings and return movement of the carriage 45 imparts a movement to the chain 94 in the direction opposite the direction indicated by the arrow in Figure 5.

As shown in Figure 3 of the drawings, brackets 113 are respectively secured to opposite sides of the top section of the chain 94 and pusher dogs 114 are respectively pivotally connected to the brackets 113 for swinging movement between operative and inoperative positions. The dogs are normally maintained in their operative positions shown in Figures 5 and 6 by counterweights 115 and are free to swing downwardly against the action of the weights 115 to positions below the bottom of a crate 30 on the carriage 45 when the chain 94 is retracted. Referring again to Figure 6 of the drawings, it will be noted that further stabilization of the dog operating chain 94 is provided by laterally spaced tracks 116. The tracks are secured to the frame structure of the carriage 45 at opposite sides of the chain 94 and are engaged by rollers 117 respectively connected to the brackets 113 on the chain 94.

Operation of transfer loading carriage

Assuming that the conveyor 20 is advancing carriers 26 in the direction of the arrow A (Figure 1) and that a carriage 45 is located at the receiving end of the loading zone 31 (Figures 1 and 8), it will be noted that movement of a crate 30 from the supply conveyor 83 to a position on the carriage 45 is prevented by a stop 118. The stop 118 comprises a roller supported on the upper end of a vertically extending arm 119 having the lower end connected to an air cylinder 120. The stop 118 is normally maintained by the air cylinder 120 in its raised or operative position shown in Figure 12 of the drawings and prevents advancement of a crate from the supply conveyor 83 to the carriage 45 until a limit switch LS-1 is tripped by a flag mounted on the approaching carrier 26 of the conveyor 20. Tripping of the limit switch LS-1 by an approaching carrier 26 operates the air cylinder 120 to withdraw the stop 118 from a position in advance of the crate 30 on the delivery end of the conveyor 83, and also closes an electric circuit for the motor 93 to drive the rolls 84. Thus, the crate 30 is moved by the conveyor 83 onto the transfer carriage 45.

As the rear end of the crate 30 is advanced onto the carriage 45 it engages a roller 121 (Figures 1 and 3) and depresses the roller 121 to trip a pair of limit switches LS-2 and LS-3. As shown in Figure 3 of the drawings, the roller 121 is carried by a plate 122 having one end pivoted by a pin 123 and having an operating rod 124 depending from the swinging end in operative relationship to the switches LS-2 and LS-3. Downward swinging movement of the plate 122 about the pin 123 is resisted by a coil spring 125 having the lower end engaging an abutment 126 on the carriage frame structure and having the upper end engaging the plate 122 directly below the roller 121. The extent of upward movement of the plate 122 by the spring 125 is limited by a stop 127 fixed to a part of the frame structure of the carriage and extending through a vertically elongated slot in the plate 122.

Downward movement of the operating rod 124 against the action of the spring 125 trips the limit switch LS-2 which is electrically interconnected with the limit switch LS-1 to maintain the circuit to the electric motor 93 closed after the switch LS-1 is released. Thus, the rollers 84 continue advancement of the crate onto the carriage 45. It will also be noted that downward movement of the rod 124 trips the limit switch LS-3 and closes an electric control circuit (not shown) for operating the air cylinder 120 to return the stop 118 to its uppermost position. In other words, as the crate 30 on the delivery end of the conveyor 83 is transferred on the carriage 45, the stop 118 is positioned to engage the next adjacent crate on the supply conveyor 83 and prevent transfer of the latter.

When the crate 30 is properly positioned on the transfer carriage 45 a limit switch LS-4 is tripped and the circuit to the motor 93 is opened to stop the rollers 84. The limit switch LS-4 is operated by a pivoted plate 129 (Figure 3) similar to the plate 122 and carrying the last roller 84 in one of the sets mounted on the carriage 45.

The above operations to load the carriage 45 are accomplished during the dwell period provided by movement of the crank 74 around the outer half of the sprocket 59 so that the transfer carriage 45 is maintained in a stationary position. However, as soon as a crate 30 is properly positioned on the carriage 45 and the crank 74 reaches the end of its dwell period in connection with the sprocket 59, the carriage 45 is advanced with the conveyor 20 at the same rate as the latter. Movement of the carriage 45 in the direction of the conveyor 20 operates the chain 94 to move the dogs 114 in a rearward direction relative to the carriage 45. The dogs 114 normally engage the front side of the crate 30 when the latter is properly positioned on the carriage 45 so that the crate is advanced by the dogs over the rollers 84 onto the platform 27 of a registering carrier 26 on the conveyor 20. By the time the carriage 45 reaches the end of its travel in the direction of advancement of the conveyor 20, the dogs 114 have been moved by the chain 94 to the rear end of the carriage 45 and the crate 30 previously supported on the carriage has been transferred by the dogs to the adjacent carrier 26. The carriage 45 is then returned to a position in registration with the supply conveyor 83 and the dogs 114 are returned by reverse movement of the chain 94 to positions at the outer end of the carriage for engagement with another crate 30.

The spacing of the carriers 26 on the conveyor 20 is predetermined so that the limit switch LS-1 is tripped by a carrier 26 to withdraw the stop 118 at about the same time the carriage 45 reaches its starting position in registration with the delivery end of the supply conveyor 83. Also, the switch LS-1 is predeterminedly spaced ahead of the loading zone 31 so that an empty carrier 26 tripping the switch LS–1 registers with the rear end of the carriage 45 at the precise time the carriage is advanced by the drive chain 57.

Figure 1:
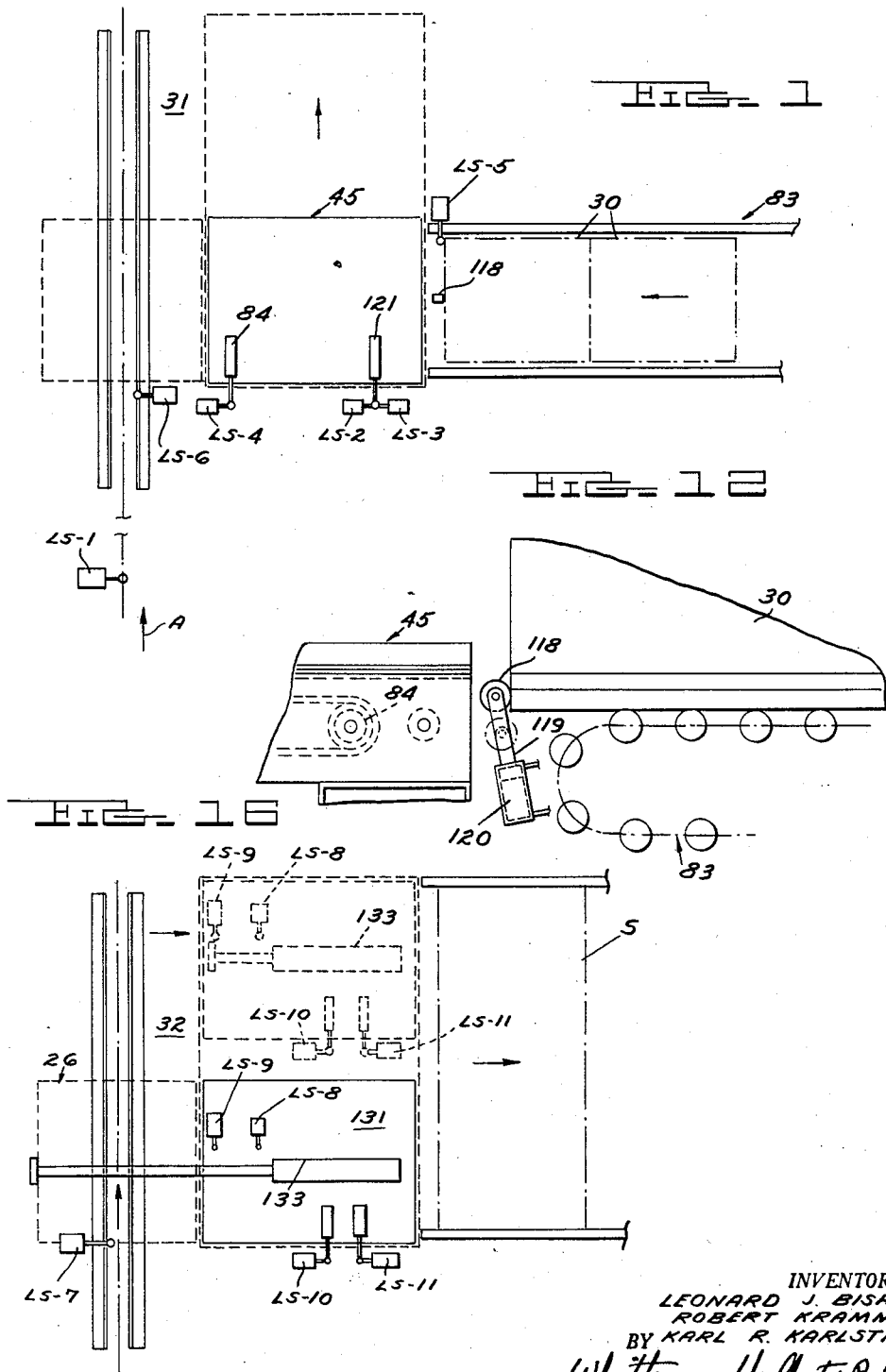
Figure 1 is a diagrammatic plan view of a part of the work handling system forming the subject matter of this invention and illustrating the loading transfer carriage.

In order to avoid any possibility of movement of the carriage 45 by the chain 57 before a crate 30 has been completely transferred on the carriage 45 from the supply conveyor 83, limit switches LS–5 and LS–6 are provided. The switches LS–5 and LS–6 are electrically interlocked in a circuit (not shown) in a manner such that should both switches be tripped, the conveyor driving chain 25 is stopped to not only discontinue movement of the conveyor 20 but to also prevent advancement of the carriage 45. As shown in Figure 1, the switch LS–5 is tripped by a crate 30 being transferred on the carriage 45 and remains in its tripped position until the crate 30 assumes a position on the carriage 45. The switch LS–6 is positioned to be tripped by a carrier 26 approaching a position in registration with the carriage 45. Thus, if a crate 30 is not fully positioned on the carriage 45 at the time a carrier 26 moves into registration with the carriage, the conveyor 20 as well as the carriage 45 is stopped and jamming of the crate is prevented.

*Unliading carriage*

The unloading carriage is indicated in Figures 13–16 by the reference numeral 131 and is positioned at the unloading station or zone 32. The carriage 131 is supported at the unloading station for movement back and forth along the path of travel of the conveyor 20 in a manner identical to the carriage 45. Also, the carriage 131 is identical to the carriage 45 with the exception that the pusher dogs 114 and associated operating mechanism are omitted. In addition, the driving means for moving the carriage 131 back and forth is the same as the driving means provided for the carriage 45. In view of the similarity of the two carriages and associated mechanisms, corresponding parts are designated by the same reference numerals.

The carriage 131 differs from the carriage 45 in that the pusher dogs 114 and associated driving means therefor are replaced with a puller unit 132. The unit 132 comprises a slide 133 mounted on the carriage frame structure 134 between the sets of feed rolls 84 for movement back and forth lengthwise of the carriage 131. As shown in Figure 15 of the drawings, the opposite sides of the slide 133 are respectively mounted on guides 135 and are held down against the guides by rollers 136. The guides 135 are fixed to the frame structure 134 at opposite sides of the slide 133 and the rollers 136 are secured to the frame structure 134 at points spaced from one another lengthwise of the slide.

The rear end of the slide 133 has a pair of dogs 137 supported thereon for pivotal movement about aligned axes extending parallel to the axes of the feed rollers 84. The dogs 137 project upwardly beyond the feed rollers 84 and are normally seated on a bar 138 fixed to the slide 133 at the rear side of the pivots for the respective dogs. Suitable springs 139 are provided for yieldably holding the dogs 137 in their upright positions against the stop bar 138. The arrangement is such that rearward movement of the slide 133, beneath a crate 30 on an adjacent carrier 26, swings the dogs forwardly and downwardly about their respective pivots. The dogs 137 are held in their lowermost positions by the crate bottom until they are advanced by the slide 133 beyond the rear side of the crate whereupon the springs return the dogs to their uppermost positions shown in Figure 13.

The slide 133 is movable rearwardly from the carriage 131 between the rollers 33 on the carrier platform 27 to engage the dogs 137 with the rear side of a crate 30 on the platform 27 and is movable forwardly to pull the crate 30 from the platform 27 to a position on the carriage 131. For accomplishing the above result, an air cylinder 140 is suitably secured to the frame structure 134 of the carriage 131 with its axis extending in the direction of movement of the slide 133. The piston of the air cylinder is connected to a cross head 141 positioned at the rear end of the cylinder and supporting a shaft 142. The shaft 142 extends perpendicular to the cylinder 140 in parallel relationship to the rollers 84, and a pair of gears 143 are secured to the shaft 142 in axial spaced relationship.

The gears 143 respectively mesh with racks 144 secured to the underside of the slide 133 and also respectively mesh with racks 145 secured to a part 146 which, in turn, is fixed on the frame structure 134 of the carriage 131. The racks 144, 145 extend in parallel relationship lengthwise of the slide 133 and cooperate with the gears 143 to move the slide 133 twice the distance of the stroke of the piston in the air cylinder 140.

It follows from the above that the carriage 131 moves back and forth at the unloading zone 32 along a path parallel to the path of travel of the conveyor 20 and at the same rate as the conveyor 20. In Figure 16 of the drawings, the carriage 131 is located in its rearwardmost position with respect to the direction of advancement of the conveyor 20 and is maintained in this position during the dwell provided by the drive sprocket 59 of the carriage operating chain 57. The driving chain 57 for the carriage 131 is operated continually so that at the end of the dwell period provided by the sprocket 59, the carriage 131 is moved forwardly. However, prior to movement of the carriage 131 in a forward direction, a carrier 26 on the conveyor 20 is moved into registration with the carriage 131 and is maintained in such registration throughout the forward motion of the carriage 131.

Referring again to Figure 16 of the drawings, it will be noted that as a carrier 26 approaches registration with the carriage 131, it trips a limit switch LS–7 arranged in a control circuit (not shown) for actuating the air cylinder 140 to move the slide 133 toward its extended position wherein the dogs 137 engage the rear side of the crate 30 mounted on the carrier 26. The arrangement is such that the slide 133 is extended beneath the crate on the carrier 26 while the carrier is in registration with the carriage 131 and during initial forward advancement of the carriage 131 by the driving chain 57.

As the slide 133 assumes its extended position it trips a limit switch LS–8 which operates the control circuit (not shown) to return the slide 133 to its retracted position. The return movement of the slide 133 is accomplished while the carriage 131 is moving forwardly as a unit with the carrier 26 so that the dogs 137 pull the crate 30 off of the carrier 26 onto the carriage 131.

As the crate 30 is being pulled off of the carrier 26 by the dogs 137 it trips a limit switch LS–9 which is interlocked with a limit switch LS–10 arranged to be tripped by the crate 30 after it has been moved completely onto the carriage 131. Should the crate fail to trip the limit switch LS–10, the driving means for the conveyor 20 is stopped and return movement of the carriage 131 to its starting position is prevented.

In the transfer carriage 45 previously described, the live rollers 84 are driven by the motor 93 in a direction to feed a crate onto an adjacent carrier 26 and provision is made for starting as well as stopping the motor 93 at the proper intervals. In connection with the unloading carriage 131, the live rollers 84 are driven in an opposite direction to move the crate onto a storage conveyor S and no provision need be made for starting and stopping the driving means for the rollers 84. In other words, a crate withdrawn from an adjacent carrier 26 continues to advance along the carriage 131 onto the storage conveyor S. As a crate 30 leaves the carriage 131, it operates a limit switch LS–11 (Figure 16) which is arranged in an electric control circuit with the limit switch LS–7 and serves to stop the conveyor 20 in the event the limit switch LS–7 should be tripped by a carrier 26 before the crate 30 on the carriage 131 has been completely removed from this carriage. Under normal conditions of operation, the crate 30 withdrawn from the carrier 26 onto the carriage 131 during forward movement of the latter is deposited on the storage conveyor S by the time the carriage 131 is returned to its starting position shown by the full lines in Figure 16 of the drawings so that the unloading operation is effected without stopping or reducing the speed of the conveyor 20.

What we claim as our invention is:

1. In a work handling system, a conveyor movable along a predetermined path of travel, driving means for the conveyor, a carriage unit supported at one side of the path of travel of the conveyor for movement back and forth along said path of travel from a preselected position, load supporting units carried by the conveyor in positions to successively register with one end of the carriage unit while the latter is supported at the preselected position aforesaid, driving means for moving the carriage unit from said preselected position in the direction of advancement of the conveyor at the same rate as the conveyor and for subsequently returning the carriage unit to said preselected position, the driving means being timed with respect to the spacing of the load supporting units on the conveyor so that a load supporting unit registers with the carriage unit at the time said carriage unit is advanced from the preselected position aforesaid in the direction of movement of the conveyor, means for transferring a load onto the carriage unit from the registering load supporting unit on the conveyor while the carriage unit is being advanced with the conveyor, said means comprising a member mounted on the carriage unit for sliding movement in opposite directions along a path extending perpendicular to the path of the conveyor, and fluid pressure operated means connected to said member for actuating the latter.

2. In a work handling system, a conveyor movable along a predetermined path of travel, a carriage unit supported at one side of the path of travel of the conveyor for movement back and forth along said path of travel from a preselected position, load supporting units carried by the conveyor in positions to successively register with the carriage unit while the latter is supported at the preselected position aforesaid, means for moving the carriage unit longitudinally from said preselected position in the direction of advancement of the conveyor in timed relation to registration of a load supporting unit with the carriage unit and at the same rate as the conveyor in that direction to maintain the carriage unit in registration with the adjacent load supporting unit throughout the longitudinal stroke of the carriage unit, and means for transferring a load from one unit to the other while the carriage unit is being advanced with the load supporting unit, said carriage unit comprising a load supporting bed having further means for feeding a load on and across the same in a direction extending transversely of the path of travel of the carriage unit.

3. The structure defined in claim 2 wherein said further means of the load supporting bed comprises rolls rotatably supported on the carriage unit in side by side relationship with their axes extending at right angles to the path of travel of the carriage unit and power means for driving said rolls.

4. The structure defined in claim 3 comprising means responsive to introducing of a load on said bed to start the power means and advance the load relative to the carriage unit, and means responsive to advancement of the load to its final position on the carriage unit to stop said power means.

5. The structure defined in claim 4 wherein the transfer means comprises a member supported on the carriage unit for movement in opposite directions along a path parallel to the direction of advancement of the load by the feeding means and having a part engageable with the load to move the load off said bed upon movement of the member in one of said directions.

6. The structure defined in claim 5 comprising means for introducing a load onto the roller bed of the carriage unit while the latter is supported at the preselected position aforesaid, and means for operating said member in response to movement of the carriage unit from said position in the direction of advancement of the conveyor.

7. In a work handling system, a conveyor movable along a predetermined path of travel, a carriage unit supported at one side of the path of travel of the conveyor for movement back and forth along said path of travel from a preselected position, load supporting units carried by the conveyor in positions to successively register with the carriage unit while the latter is supported at the preselected position aforesaid, means for moving the carriage unit from said preselected position in the direction of advancement of the conveyor in timed relation to registration of a load supporting unit with the carriage unit and at the same rate as the conveyor to maintain the carriage unit in registration with the adjacent load supporting unit throughout the forward stroke of the carriage unit, means for transferring a load from one unit to the other while the carriage unit is being advanced with the load supporting unit, a track extending along the path of the carriage unit, wheels mounted on the carriage unit and engageable with the track, a gear rack fixed against movement with the carriage unit and extending lengthwise of the track, a gear rotatably supported on the carriage unit and meshing with the rack for rotation by the rack in response to movement of the carriage unit in opposite directions along the track, and means operatively connecting the gear to the transfer means for operating the same.

8. In a work handling system, a conveyor movable along a predetermined path of travel, a carriage unit supported at one side of the path of travel of the conveyor for movement back and forth along said path of travel from a preselected position, load supporting units carried by the conveyor in positions to successively register with the carriage unit while the latter is supported at the preselected position aforesaid, means for moving the carriage unit from said preselected position in the direction of advancement of the conveyor in timed relation to registration of a load supporting unit with the carriage unit and at the same rate as the conveyor to maintain the carriage unit in registration with the adjacent load supporting unit throughout the forward stroke of the carriage unit, means for transferring a load from one unit to the other while the carriage unit is being advanced with the load supporting unit, means for introducing a load on the carriage unit while the latter is positioned at the preselected position aforesaid, means on the carriage unit for feeding the load along the carriage unit, and means for discontinuing the operation of the feeding means in response to movement of the load to a position wherein it is supported solely by the carriage unit.

9. The structure defined in claim 8 comprising means responsive to movement of the load along the carriage unit by the feeding means for rendering the carriage unit driving means inoperative to move said carriage unit until the load is fed to its final position on the carriage unit.

10. The structure defined in claim 9 wherein the transfer means comprises a member supported by the carriage unit for movement in opposite directions along a path extending in the direction of movement of the load by the feeding means and having a part engageable with the load after the latter has been positioned on the carriage unit by the feeding means, and means responsive to movement of the carriage unit in the direction of advancement of the conveyor for moving said member in a direction to transfer the load from the carriage unit to the adjacent load supporting unit on the conveyor.

11. In a work handling system, a conveyor movable along a predetermined path of travel, driving means for the conveyor, a carriage unit supported at one side of the path of travel of the conveyor for movement back and forth along said path of travel from a preselected position, load supporting units carried by the conveyor in positions to successively register with one end of the carriage unit while the latter is supported at the preselected position aforesaid, driving means for moving the carriage unit from said preselected position in the direction of advancement of the conveyor at the same rate as the conveyor and for subsequently returning the carriage unit to said preselected position, the driving means being timed with respect to the spacing of the load supporting units on the conveyor so that a load supporting unit registers with the carriage unit at the time said carriage unit is advanced from the preselected position aforesaid in the direction of movement of the conveyor, means for transferring a load from one unit to the other while the carriage unit is being advanced with the conveyor, load supply means adjacent the preselected position aforesaid for feeding a load onto the carriage unit, said transfer means comprising a member supported on the carriage unit for movement relative thereto and movable in response to advance of the carriage unit with the conveyor to transfer the load from the carriage unit to a position on the registering loading supporting unit on the conveyor, said carriage unit having further means for feeding a load on and across the same in a direction transverse of the path of travel of the carriage unit.

12. The structure defined in claim 11 wherein the driving means for the carriage unit moves the latter back and forth along the path of travel of the conveyor at regular intervals and provides a dwell period at the preselected position of the carriage unit of sufficient duration to enable feeding a load onto the carriage unit by said load supply means.

13. The structure defined in claim 12 comprising a retractable stop positioned at the delivery end of the supply means for engaging the load at the delivery end of said supply means to prevent feeding of said load onto the carriage unit, and means operated by a load supporting unit approaching the preselected position aforesaid to retract said stop.

14. The structure defined in claim 13 comprising means operated by a load being fed onto the carriage unit from the supply means for returning the stop to its operative position with respect to the delivery end of the supply means.

15. In a work handling system, a driven conveyor continuously movable along a predetermined path of travel, said conveyor being provided with spaced load bearing units moved thereby, a carriage unit supported at one side of the path of travel of the conveyor for movement back and forth along said path of travel from and to a preselected position on loading and return strokes, said load bearing units being moved by said conveyor to register with said carriage unit while the latter is supported at said preselected position, means for moving said carriage unit on a loading stroke unidirectionally and alongside of said conveyor at the same linear speed as said load bearing units, whereby to maintain said carriage unit in registration with the adjacent load bearing unit through said loading stroke of the carriage, a transfer device mounted on and bodily movable with said carriage unit, said device being movable relative to said carriage unit at a right angle to the direction of movement of the latter, and drive means for said transfer device mounted on said carriage unit for movement therewith and acting on said transfer device to move the same during said loading stroke, said carriage unit having further means for feeding a load on and across the same in a direction transverse of the path of travel of the carriage unit.

16. In a work handling system, a driven conveyor continuously movable along a predetermined path of travel, said conveyor being provided with spaced load bearing units moved thereby, a carriage unit supported at one side of the path of travel of the conveyor for movement back and forth along said path of travel from and to a preselected position on loading and return strokes, said load bearing units being moved by said conveyor to register with said carriage unit while the latter is supported at said preselected position, means for moving said carriage unit on a loading stroke unidirectionally and alongside of said conveyor at the same linear speed as said load bearing units, whereby to maintain said carriage unit in registration with the adjacent load bearing unit through said loading stroke of the carriage, a transfer device mounted on and bodily movable with said carriage unit, said device being movable relative to said carriage unit at a right angle to the direction of movement of the latter, drive means for said transfer device mounted on said carriage unit for movement therewith and acting on said transfer device to move the same during said loading stroke, said carriage unit having further means for feeding a load on and across the same in a direction transverse of the path of travel of the carriage unit, and a mechanical drive connection between said carriage unit and said conveyor for operating the same in synchronism.

References Cited in the file of this patent

UNITED STATES PATENTS

| | | |
|---|---|---|
| 2,008,960 | Lampard | July 23, 1935 |
| 2,541,809 | Clark | Feb. 13, 1951 |
| 2,576,366 | Smith | Nov. 27, 1951 |
| 2,644,625 | Currivan | July 7, 1953 |
| 2,731,127 | Harrison | Jan. 17, 1956 |